(12) United States Patent
Vos, Jr.

(10) Patent No.: US 10,807,846 B1
(45) Date of Patent: Oct. 20, 2020

(54) REMOTELY ADJUSTABLE AUTOMOTIVE LIFT ARM

(71) Applicant: Richard Everett Vos, Jr., Monee, IL (US)

(72) Inventor: Richard Everett Vos, Jr., Monee, IL (US)

(*) Notice: Subject to any disclaimer, the term of this patent is extended or adjusted under 35 U.S.C. 154(b) by 0 days.

(21) Appl. No.: 16/831,613

(22) Filed: Mar. 26, 2020

Related U.S. Application Data

(60) Provisional application No. 62/835,380, filed on Apr. 17, 2019.

(51) Int. Cl.
*B66F 7/16* (2006.01)
*B66F 7/28* (2006.01)
*F16H 7/06* (2006.01)
*F16H 25/20* (2006.01)

(52) U.S. Cl.
CPC ............... *B66F 7/16* (2013.01); *B66F 7/28* (2013.01); *B66F 2700/04* (2013.01); *B66F 2700/123* (2013.01); *F16H 7/06* (2013.01); *F16H 25/20* (2013.01); *F16H 2025/2046* (2013.01); *F16H 2025/2096* (2013.01)

(58) Field of Classification Search
CPC .......... B66F 7/16; B66F 7/28; B66F 2700/04; B66F 2700/123; F16H 7/06; F16H 25/20; F16H 2025/2046; F16H 2025/2096
See application file for complete search history.

(56) References Cited

U.S. PATENT DOCUMENTS

| 2,461,058 | A | * | 2/1949 | Houston | B66F 11/048 |
| | | | | | 248/125.2 |
| 5,586,620 | A | * | 12/1996 | Dammeyer | B66F 9/0755 |
| | | | | | 187/227 |
| 6,663,298 | B2 | * | 12/2003 | Haney | G03B 17/00 |
| | | | | | 396/419 |
| 7,320,385 | B2 | | 1/2008 | Katae et al. | |
| 8,718,372 | B2 | * | 5/2014 | Holeva | B66F 9/24 |
| | | | | | 382/181 |
| 9,376,296 | B2 | * | 6/2016 | Nussbaum | B66F 7/20 |
| 9,404,618 | B2 | | 8/2016 | Brown et al. | |
| 9,684,228 | B2 | * | 6/2017 | Jodoin | G03B 17/563 |

(Continued)

FOREIGN PATENT DOCUMENTS

DE 102015202246 A1 8/2016
EP 2708489 B1 12/2014

*Primary Examiner* — Michael A Riegelman

(57) ABSTRACT

A remotely adjustable automotive lift arm allows a user to position lift arms under the vehicle, extend them to the correct length, and position lifting pads to the correct location and height, all without requiring the user to bend over or kneel. The remotely adjustable automotive lift arm includes a telescopic arm, a screw jack assembly, a camera assembly, a gear assembly, and an input shaft. The telescopic arm includes two tubes with one being telescopically engaged to the other. The screw jack assembly is used to adjust the lifting pad height to achieve a level lift of a vehicle prior to the vehicle being lifted off the ground. The camera assembly provides a live image of the vehicle's undercarriage in order to precisely position the screw jack assembly. The input shaft can receive an input torque than can be transferred to the screw jack assembly by the gear assembly.

8 Claims, 9 Drawing Sheets

(56) References Cited

U.S. PATENT DOCUMENTS

| | | | | |
|---|---|---|---|---|
| 2004/0098146 A1* | 5/2004 | Katae | .................... | B66F 9/0755 |
| | | | | 700/50 |
| 2009/0003822 A1* | 1/2009 | Tyner | .................... | F16M 11/32 |
| | | | | 396/428 |
| 2016/0152454 A1* | 6/2016 | Stapensea | ............. | B66F 7/0666 |
| | | | | 700/213 |
| 2017/0088405 A1* | 3/2017 | De Jong | ................... | B66F 7/28 |
| 2018/0194601 A1* | 7/2018 | Van Houten | .............. | B66F 7/20 |
| 2018/0339890 A1* | 11/2018 | Perlstein | ................... | B66F 7/20 |

\* cited by examiner

REMOTELY ADJUSTABLE AUTOMOTIVE LIFT ARM

The current application claims a priority to the U.S. Provisional Patent application Ser. No. 62/835,380 filed on Apr. 17, 2019.

FIELD OF THE INVENTION

The present invention relates generally to an adjustable lift arm for automotive lifts. More specifically, the present invention relates to an adjustable automotive lift arm that allows remote positioning of the lift arm and lifting pad by a user.

BACKGROUND OF THE INVENTION

There are various kinds of automotive lifts. One common version is an above ground, two post style lift. Above ground, two post style lifts typically comprise two vertical lifting columns with a lifting carriage on each column and two arms on each lifting carriage.

A problem with these lifts is that to safely lift the vehicle, the user must bend over far enough, or kneel, or lay on the floor next to the vehicle, to actually see under the vehicle, then grasp the end of the lift arm to adjust it to the correct position under the vehicle. To further the problem, many vehicular contact points have to be raised or lowered to the correct position under the frame or pick-up points on the vehicle. This is a tedious, time consuming task and is physically hard on the users back, neck, and knees. Additionally, incorrectly positioned lifting pads can result in damage to the vehicle, the lift, or the user.

SUMMARY OF THE INVENTION

The present invention would allow the technician to position the lift arms under the vehicle, extend them to the correct length, and position the lifting pads to the correct position and height, all without requiring the technician to bend over or kneel. The present invention would be a cost effective addition to popular automotive lifts, and the physical benefits for automotive technicians by means of easier lift arm manipulation combined with the benefits to shop owners the camera system would provide for training and liability purposes would make this a highly sought after addition to automotive lifts in the commercial market.

DETAILED DESCRIPTION OF THE INVENTION

Figure 1:
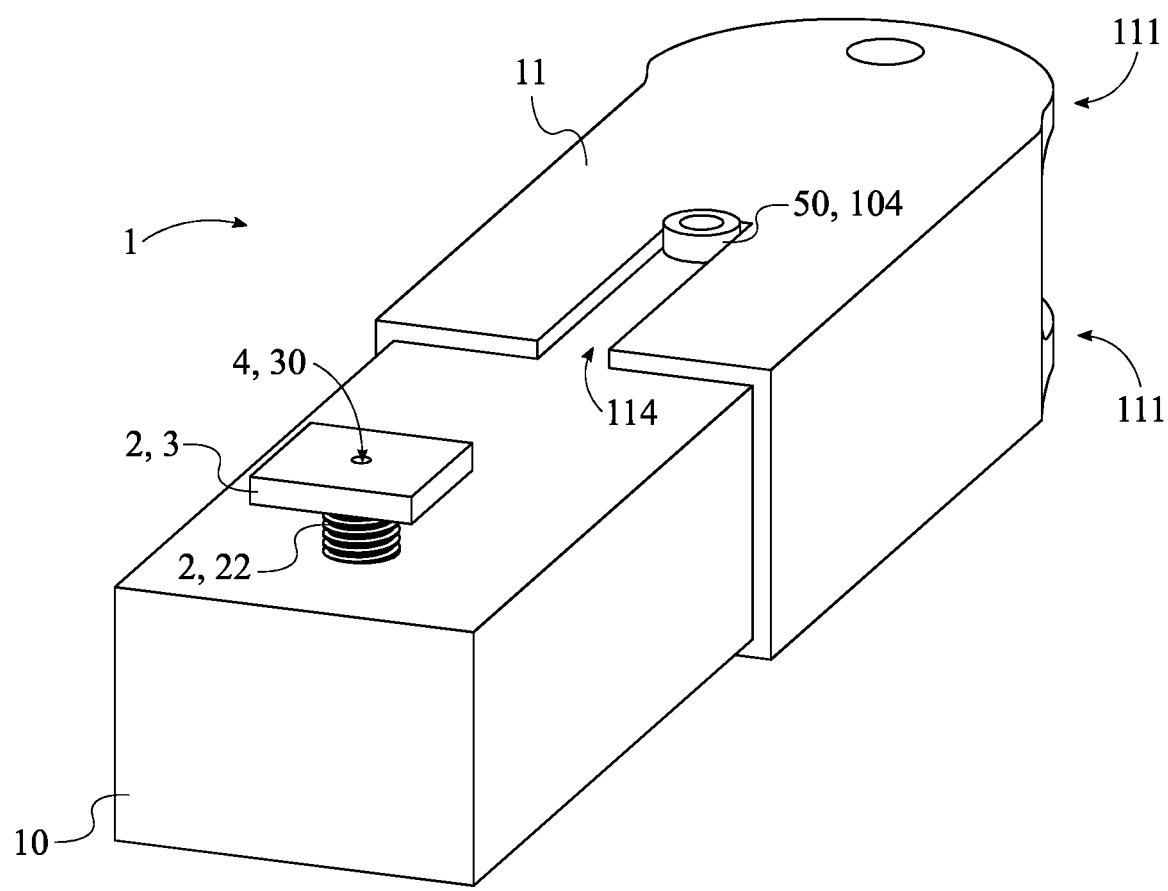
FIG. 1 is a front top perspective view of the present invention.

All illustrations of the drawings are for the purpose of describing selected versions of the present invention and are not intended to limit the scope of the present invention.

The present invention is a remotely adjustable automotive lift arm that allows a user to position the lift arms under the vehicle, extend them to the correct length, and position the lifting pads to the correct location and height, all without requiring the user to bend over or kneel. The present invention is a modification of current lift arm designs. The present invention comprises a telescopic arm 1, a screw jack assembly 2, a lifting pad 3, a camera assembly 4, a gear assembly 5, and an input shaft 50. In reference to FIGS. 1 and 2, the telescopic arm 1 comprises a first housing 11 and a second housing 10 which are preferably two square or rectangular tubes. An inner diameter of the first housing 11 is slightly larger than an outer diameter of the second housing 10, allowing the second housing 10 to fit inside the first housing 11 and slide in or out to change the overall length of the telescopic arm 1. The telescopic arm 1 further comprises a pair of attachment features 111 which allows the telescopic arm 1 to attach to the lifting carriage 600 of an automotive lift. The pair of attachment features 111 is terminally integrated into the first housing 11, opposite the second housing in order to be easily accessible for attaching the present invention to a lifting carriage 600 of an automobile lift. The pair of attachment features 111 is preferably a pair of sockets, each of which includes an attaching portion. A pin or shaft is inserted through the attaching portion of each of the pair of sockets, and into the lifting carriage 600 of an automotive lift, in a manner that allows the telescopic arm 1 to freely move in a horizontal arc.

The second housing 10 is sleeved by the first housing 11 in a manner where the second housing 10 slides into the open end of the first housing 11 allowing the second housing 10 to telescope in or out. The telescopic arm 1 includes holes or sockets in required places to allow insertion of the various components and serve as shaft supports where required. The camera assembly 4 is inserted into one of these sockets directly opposite the screw 22.

Figure 2:
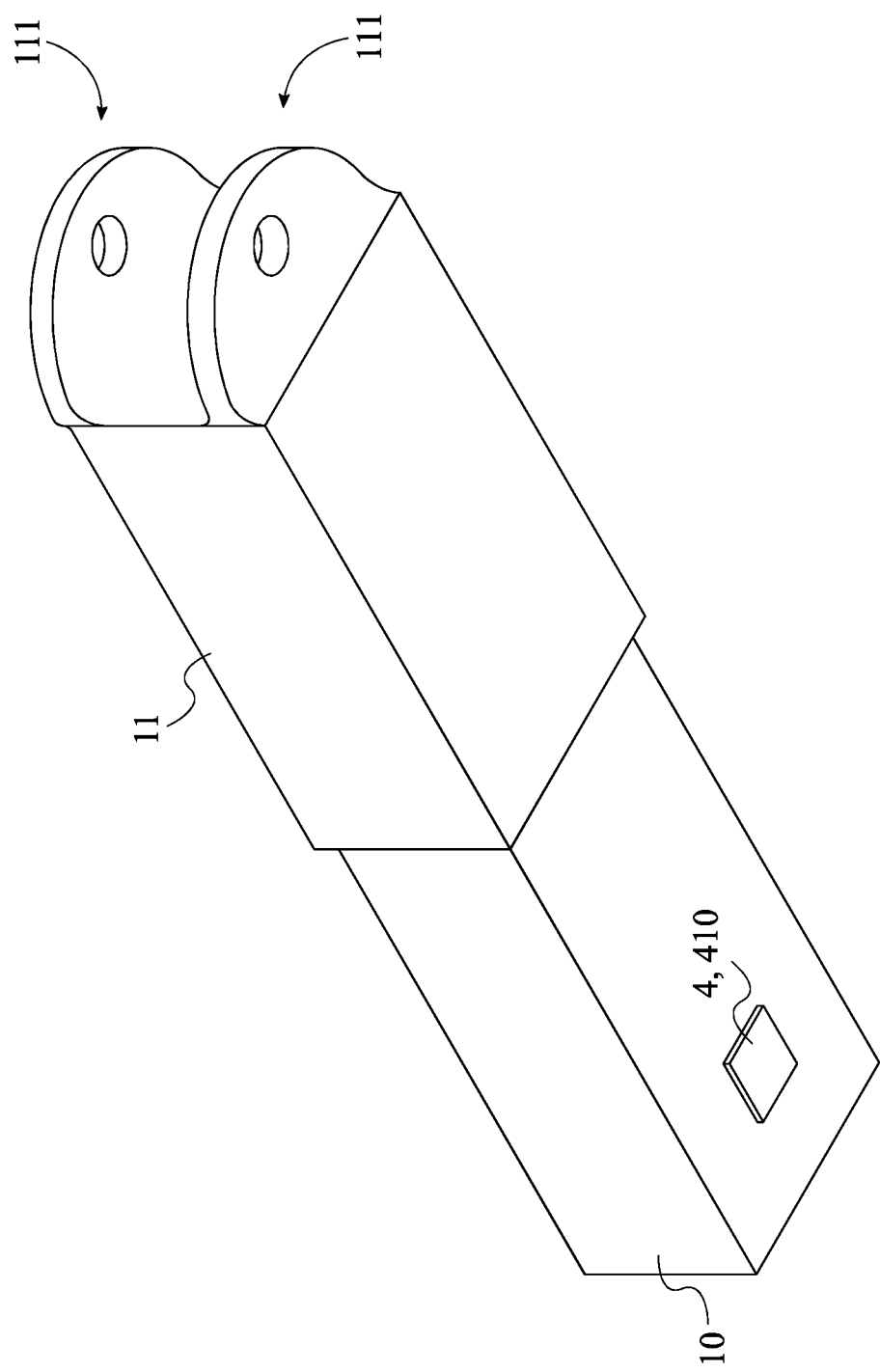
FIG. 2 is a rear bottom perspective view of the present invention.
Figure 3:
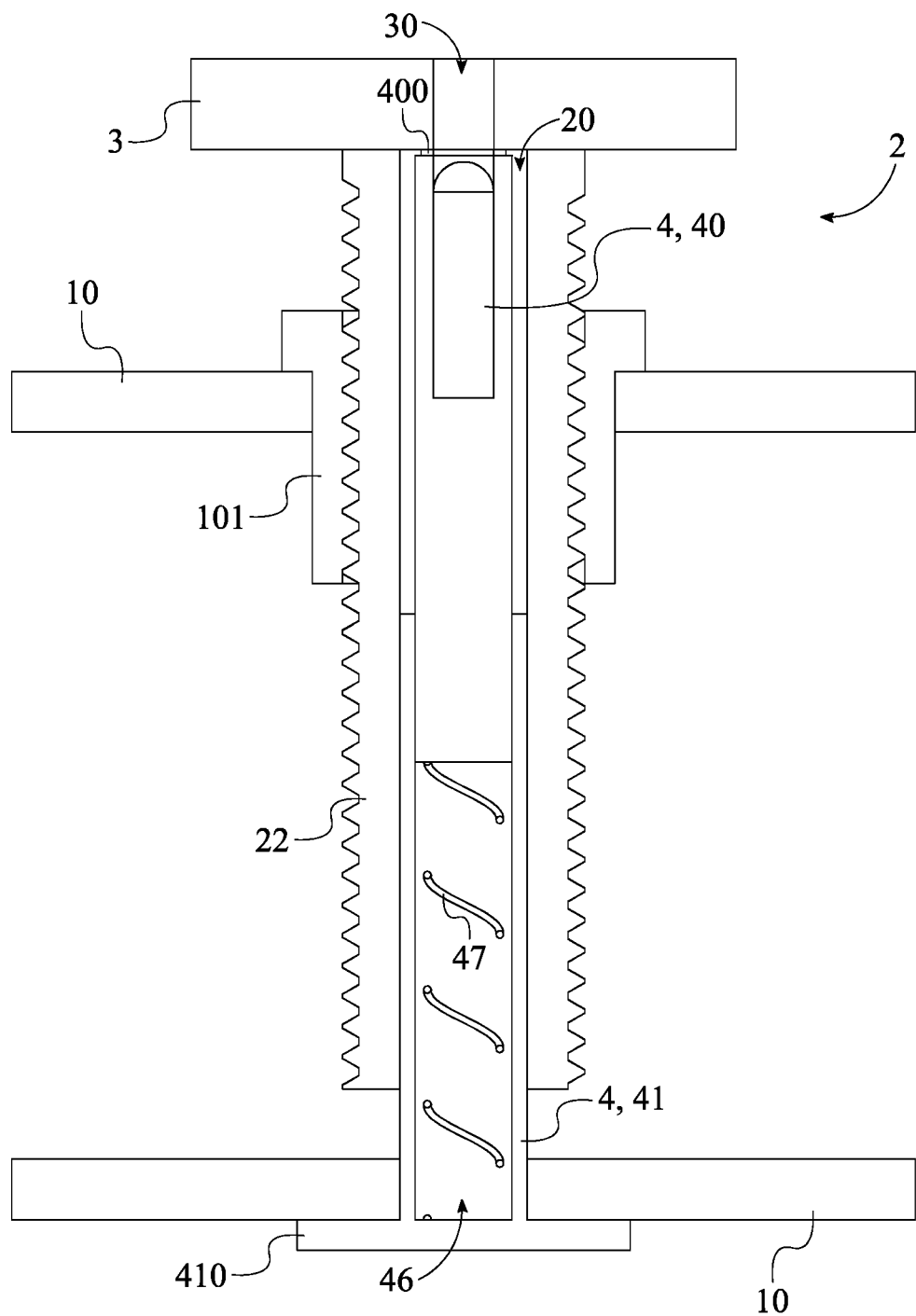
FIG. 3 is a schematic view of the screw receiving the camera assembly.

In reference to FIGS. 1 and 3, a distal end of the second housing 10 furthest from the lifting carriage 600 contains a screw jack assembly 2. The screw jack assembly 2 comprises a screw 22, a lifting pad 3, and an aperture 30. The screw 22 is threadably mounted into the second housing 10 and is aligned to be perpendicular with the longitudinal axis of the telescopic arm 1. The lifting pad 3 is terminally connected to the screw 22, and the aperture 30 traverses through the lifting pad 3. In further detail, the aperture 30 is on center with a longitudinal channel 20 of the screw 22 and allows for a clear line of sight through the screw 22 and lifting pad 3. The lifting pad 3 is positioned external to the second housing 10. This arrangement allows the lifting pad 3 to contact a vehicle's undercarriage when the present invention is in use. The input shaft 50 transfers torsional energy to the screw 22 allowing the screw 22 to be rotated into or out of the second housing 10. The input shaft 50 is mounted to second housing 10, offset from the screw 22, and the screw 22 and the input shaft 50 are parallel to each other.

Further, the screw 22 is torsionally engaged to the input shaft 50 by the gear assembly 5. Thus, the input shaft 50 can transfer torsional energy to the screw 22 when an input torque is applied to the input shaft 50. The camera assembly 4 is compressibly mounted within the screw 22. In further detail, the camera assembly 4 inserted through the bottom of the second housing 10 directly below the screw 22, and up inside the longitudinal channel 20 of the screw 22. A camera module 40 of the camera assembly 4 is in optical communication with the aperture 30 to provide the user alive image of the vehicle's undercarriage.

Figure 4:
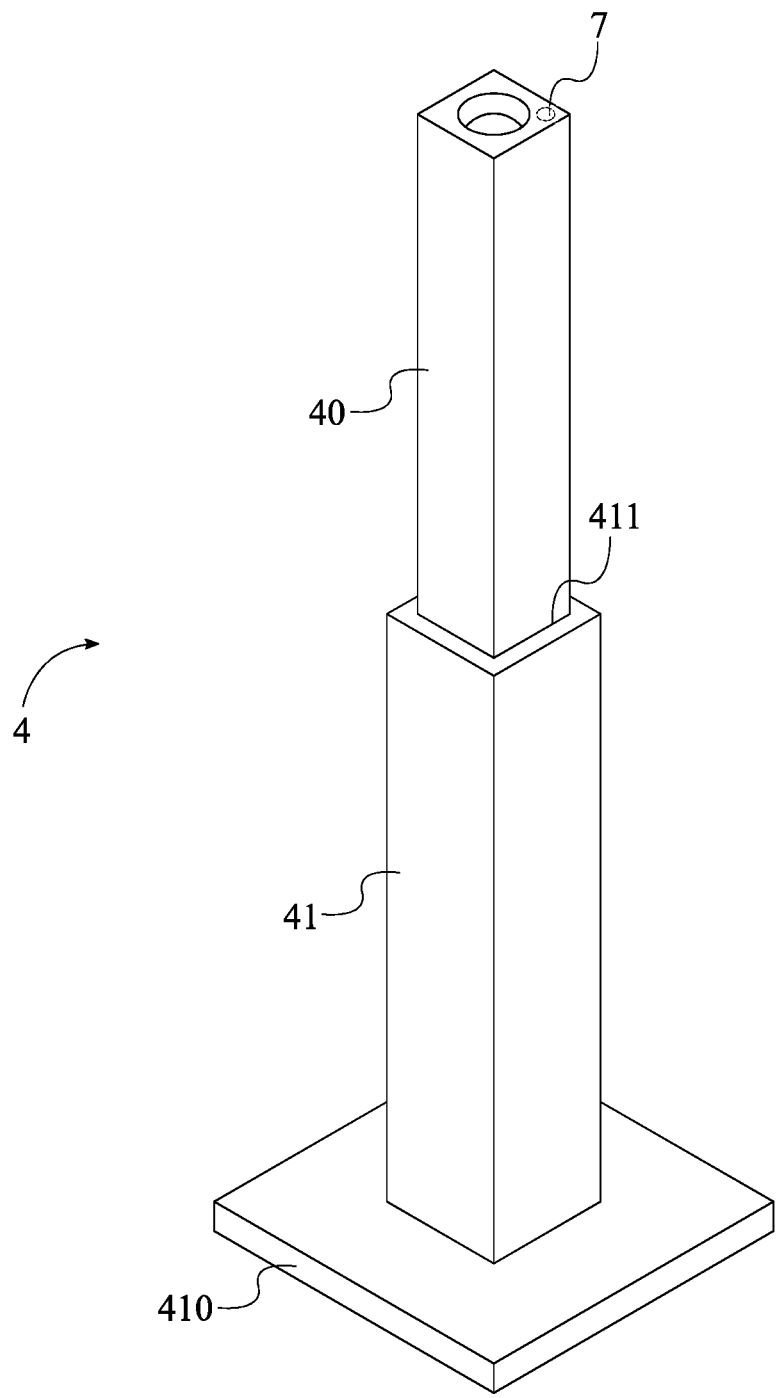
FIG. 4 is a perspective view of the camera assembly.

In reference to FIGS. 3 and 4, the camera assembly 4 further comprises a camera mount 41 and a flange 410. The present invention may further comprise a spring 47 in order to compressibly mount the camera assembly 4 within the screw 22. The camera module 40 is sleeved by the camera mount 41. In further detail, the camera mount 41 and the camera module 40 are preferably tubing of different diameters to allow a telescoping connection between the two. The camera module 40 and the camera mount 41 preferably have a non-circular shape that allows an intermeshing of the two sections 411 to create a non-rotational joining, while retaining its ability to slide in or out. The flange 410 is terminally connected to the camera mount 41 and is positioned external to the second housing 10, opposite to the lifting pad 3. In further detail, the flange 410 is attached to the bottom of the camera mount 41 and serves to attach the camera mount 41 to the second housing 10. The non-rotational mounting of the camera assembly 4 results in a stable viewing perspective during rotation of the screw 22 and lifting pad 3. The spring 47 or a similar compression device is positioned within a spring-receiving channel 46 of the camera mount 41. The camera mount 41 and the camera module 40 are positioned within the longitudinal channel 20 of the screw 22. Further, the camera module 40 is pressed against the lifting pad 3 by the spring 47. In further detail, the spring 47 is mounted inside the two telescoping tubes in a way that forces the camera module 40 up inside the longitudinal channel 20 of the screw 22, until it makes contact with the smaller diameter hole of the lifting pad 3, or a similar stop. A thrust bearing or washer 400 can be installed at the point where the camera module 40 and the stop meet to prevent wear. The camera module 40 can follow the lifting pad 3 as the lifting pad 3 descends as a result of the spring 47 contracting and follow the lifting pad 3 as the lifting pad 3 ascends as a result of the spring 47 expanding. The camera assembly 4 provides a direct line of sight through the screw 22 and lifting pad 3, and its projected image can be sent to a mounted or handheld digital display, either by cables or by wireless means. The camera assembly 4 or the lifting pad 3 can incorporate a protective lens cover, and lighting for the camera. Video support components can be housed inside the telescopic arm 1. For example, the camera assembly 4 may further comprise at least one light 7. The at least one light 7 is useful when the present invention is used in poorly-lit areas. The at least one light 7 is integrated into the camera module 40. Thus, the at least one light 7 aids in providing a well-lit image of the vehicle's undercarriage.

Figure 9:
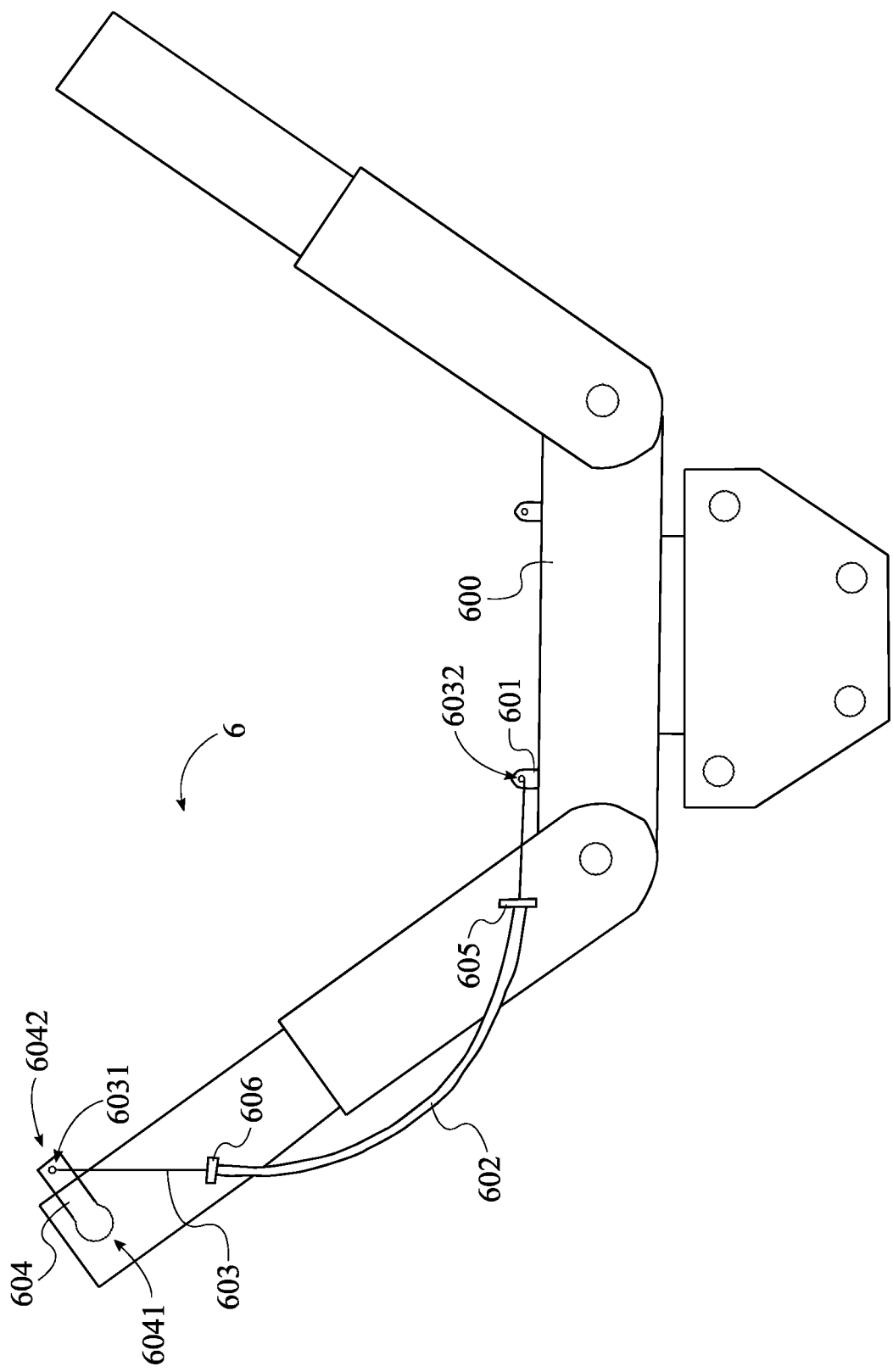
FIG. 9 is a top view of an embodiment of the present invention with self-adjusting cameras.

In reference to FIG. 9, in one embodiment, the camera assembly 4 can be rotationally mounted to the telescopic arm 1, to allow adjustment of the viewing perspective. Continuing with this embodiment, the camera assembly 4 can be mechanically linked to the lifting carriage 600 of an automobile lift by a cable assembly 6 resulting in a viewing perspective that remains parallel to the lifting carriage 600 and vehicle as the present invention is positioned under the vehicle. The cable assembly 6 comprises a cable body 603, a cable sleeve 602, a first cable guide 605, a second cable guide 606, a cable lever 604, and a lifting carriage 600 anchor 601. The cable body 603 is a semi-rigid elongated strip of material that comprises a fixed body end 6031 and a free body end 6032. The cable lever 604 comprises a fixed lever end 6041 and a free lever end 6042. The cable lever 604 is positioned external to the second housing 10, opposite to the lifting pad 3. This arrangement allows the camera assembly 4 to be rotated separately from the screw 22. The fixed lever end 6041 is torsionally connected to the camera assembly 4 in order to rotate the camera assembly 4 as the cable lever 604 is rotated. The fixed body end 6031 is connected to the free lever end 6042 in order for the cable lever 604 to be rotated as the cable body 603 is translated when the present invention is adjusted in reference to the lifting carriage 600. The first cable guide 605 and the second cable guide 606 are used to guide the cable body 603 along the telescopic arm 1. The first cable guide 605 is connected external to the first housing 11, and the second cable guide 606 is connected external to the second housing 10. This allows the cable body 603 to be guided from the second housing 10 to the first housing 11. The cable sleeve 602 is a flexible cable housing that is connected in between the first cable guide 605 and the second cable guide 606. The cable body 603 traverses through the cable sleeve 602, and thus, the cable sleeve 602 protects the cable body 603 by preventing wear and tear to the cable body 603. The lifting carriage 600 anchor 601 allows the cable body 603 to be mounted to the lifting carriage 600 of an automobile lift. The free body end 6032 is connected to the lifting carriage 600 anchor 601 in order for the camera assembly 4 to be mechanically linked to the lifting carriage 600 of an automobile lift by the cable assembly 6. In further detail, as the telescopic arm 1 is moved horizontally, the distance between fixed body end 6031 and the free body end 6032 changes in length. This length change is transmitted to the camera assembly 4 through the cable assembly 6, therefore, rotating the camera assembly 4 to remain parallel with the lifting carriage 600 of an automobile lift. Furthermore, the length of the cable body 603 allows full extension of the telescopic arm 1.

Figure 5:
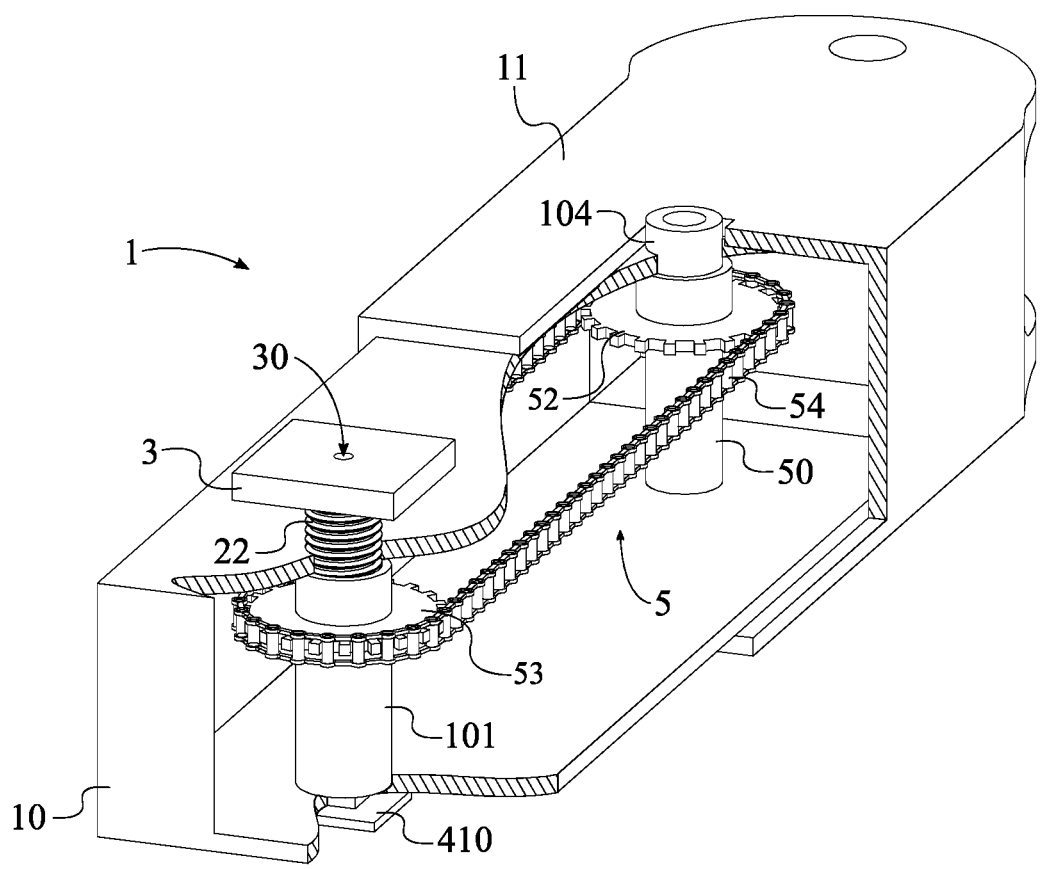
FIG. 5 is a perspective view of an embodiment of the present invention with portions of the telescopic arm removed from view.
Figure 8:
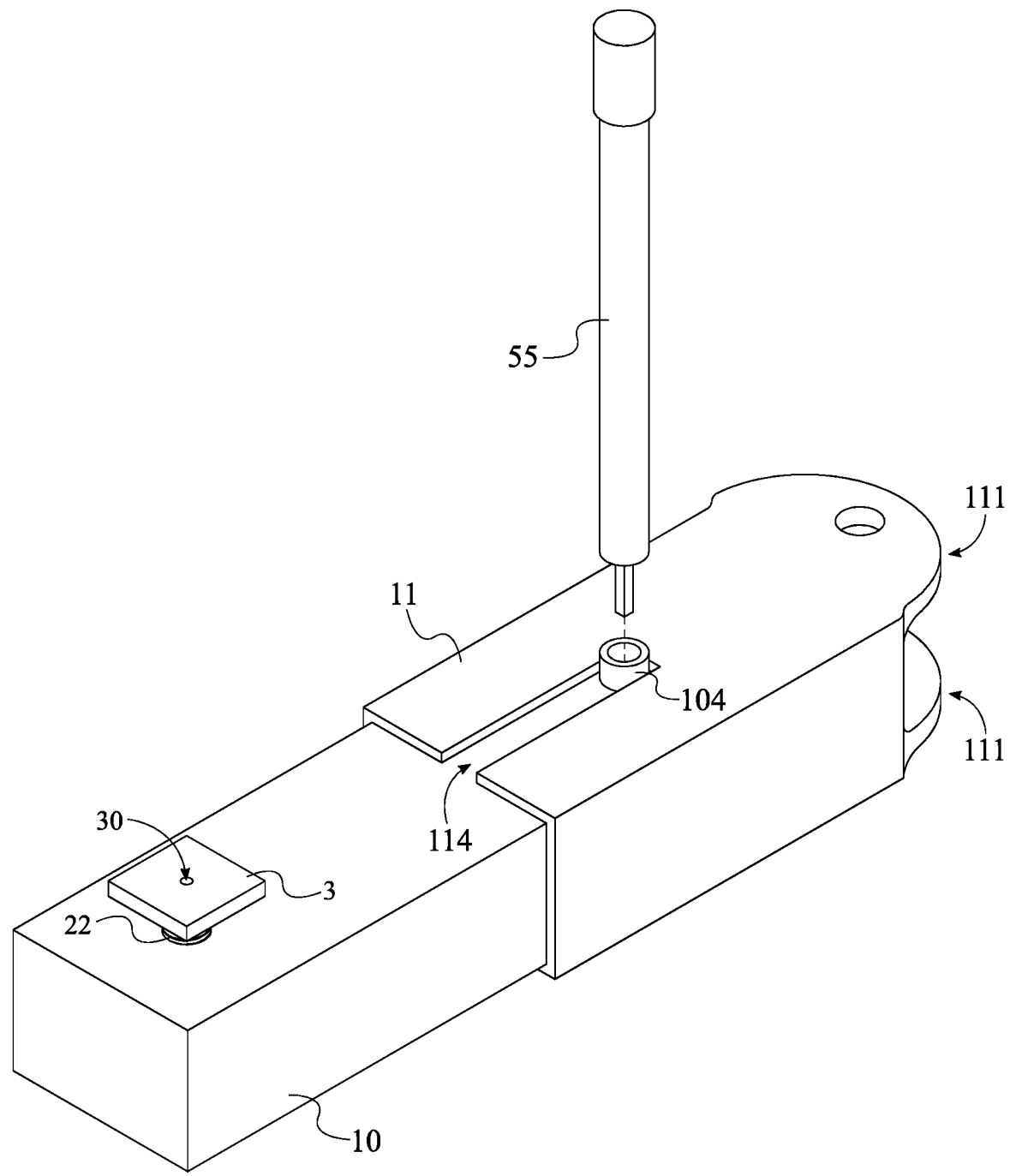
FIG. 8 is a perspective view of the present invention displaying how the extension handle attaches to the input shaft.

In reference to FIGS. 5 and 8, the gear assembly 5 transfers rotational movement from the input shaft 50 located near the end of arm 10 opposite the screw 22. The input shaft 50 is aligned to be perpendicular with the longitudinal axis of the telescopic arm 1 and is aligned to be parallel with the screw 22. The input shaft 50 extends through a socket in the top of the second housing 10. The bottom of the input shaft 50 can be rotationally mounted in a socket 104 in the second housing 10. The input shaft 50 can be hollow and keyed to allow insertion of an extension handle 55. The extension handle 55 is positioned external to the telescopic arm 1 and can be torsionally engaged to the input shaft 50. Thus, the extension handle 55 allows the user to position telescopic arm 1 and adjust the lifting pad 3 from a standing position. In different embodiments of the invention, the gear assembly 5 could comprise any style of assembly that can transfer rotational movement from one shaft to another, including sprocket gears and roller chain, belt and pulleys, or a horizontal drive shaft and gears. The gear assembly 5 could be driven by the user or incorporate an electric motor.

In reference to FIG. 5, in one embodiment of the gear assembly 5, the gear assembly 5 comprises an input sprocket gear 52, an output sprocket gear 53, an output threaded sleeve 101, and a roller chain 54. The input shaft 50 is rotatably mounted within the second housing 10. In further detail, the input shaft 50 is unthreaded and is mounted in a rotational way using sockets in the arm as bearing mounts. The input sprocket gear 52 is laterally connected to the input shaft 50 in order to allow the input sprocket gear 52 to rotate as the input shaft 50 is rotated by a torque force. The output threaded sleeve 101 is rotationally mounted within the second housing 10 and is engaged by the screw 22. The output threaded sleeve 101 is mounted in a rotational way using reinforced sockets in the telescopic arm 1 as bearing mount. The output threaded sleeve is engaged by the screw 22 which allows the screw 22 to be fastened into or out of the output threaded sleeve 101. The output sprocket gear 53 is laterally connected to the output threaded sleeve 101 in order to allow the output threaded sleeve 101 to rotate as the output sprocket gear 53 is rotated. Further, the input sprocket gear 52 is torsionally engaged to the output sprocket gear 53 by the roller chain 54. In further detail, as the input shaft 50 and the input sprocket gear 52 are rotated by a torque force, the rotary motion is transferred by the roller chain 54 to the output sprocket gear 53 and output threaded sleeve 101, causing the screw 22 to be fastened into or out of the output threaded sleeve 101. The screw 22 is kept from rotating by the shape of the camera mount 41 interacting with a corresponding shape inside the screw 22. As the output threaded sleeve 101 and the screw 22 interact, the rotary motion becomes a vertical motion of the screw 22 and lifting pad 3. As weight is applied to the lifting pad 3, while lifting the vehicle, the downward force exerted on the output threaded sleeve 101 forces the output threaded sleeve 101 to push down against the telescopic arm 1 for support, serving as a brake for the output threaded sleeve 101, to prevent vertical movement of the lifting pad 3 under load.

Figure 6:
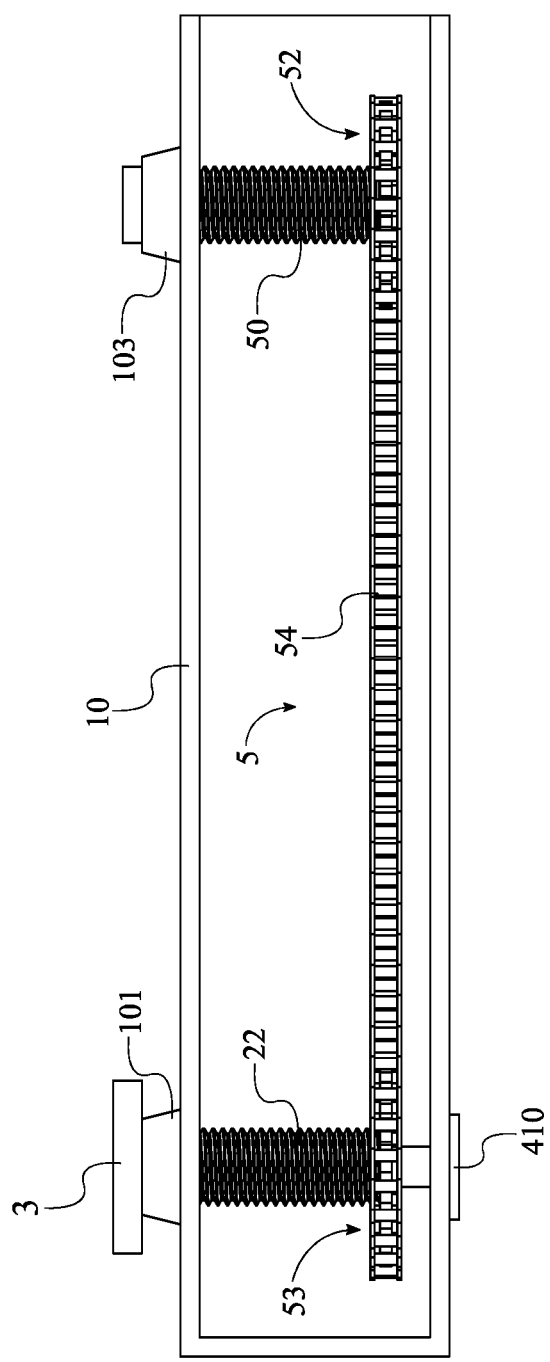
FIG. 6 is a schematic view of another embodiment of the present invention with a simpler setup.
Figure 7:
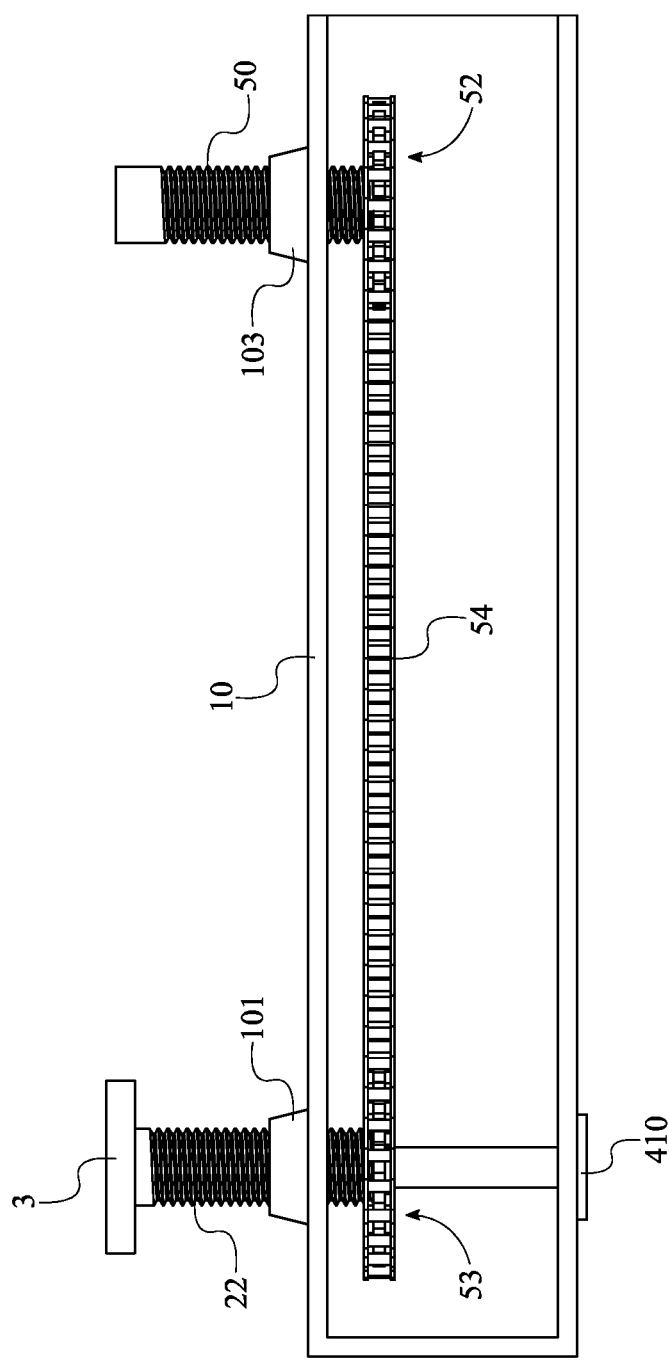
FIG. 7 is a schematic view of another embodiment of the present invention with a simpler setup where the lifting pad is elevated.

In reference to FIGS. 6 and 7, in another embodiment of the gear assembly 5, the gear assembly 5 comprises an input sprocket gear 52, an output sprocket gear 53, an input threaded sleeve 103, and output threaded sleeve 101, and a roller chain 54. The input threaded sleeve 103 and the output threaded sleeve 101 are externally mounted onto the second housing 10. This arrangement respectively allows the input shaft 50 and the screw 22 to be fastened into or out of the second housing 10. The input threaded sleeve 103 and the output threaded sleeve 101 are positioned offset from each other. The input threaded sleeve 103 and the output threaded sleeve 101 are offset from each other so their respective engagement components are able to function without mechanically interfering with each other. The input threaded sleeve 103 is threadably engaged by the input shaft 50. Thus, the input shaft 50 can be fastened into or out of the input threaded sleeve 103. The output threaded sleeve 101 is engaged by the screw 22 which allows the screw 22 to be fastened into or out of the output threaded sleeve 101. The input sprocket gear 52 and the output sprocket gear 53 are positioned within the second housing 10 in order to conceal the gear assembly 5. The input sprocket gear 52 is laterally connected to input shaft 50 in order to allow the input sprocket gear 52 to rotate as the input shaft 50 is rotated by a torque force. The output sprocket gear 53 is laterally connected to the screw 22 in order to allow the screw 22 to rotate as the output sprocket gear 53 is rotated. Further, the input sprocket gear 52 is torsionally engaged to the output sprocket gear 53 by the roller chain 54. In further detail, as the input shaft 50 and input sprocket gear 52 are rotated, the roller chain 54 transfers the rotational movement to the output sprocket gear 53 and the screw 22. As the screw 22 and input shaft 50 are rotated respectively through the output threaded sleeve 101 and the input threaded sleeve 103, affixed to the top of the telescopic arm 1, the result is a unison vertical movement by the screw 22, the lifting pad 3, the input shaft 50, the input sprocket gear 52, the output sprocket gear 53, and roller chain 54. The camera assembly 4 is fixed to the bottom of the telescopic arm 1 while the non-rotational camera module 40 retains a stable image through the screw 22.

With reference to FIG. 1 and in order to allow the second housing 10 to properly slide into and out of the second housing 10, the telescopic arm 1 may further comprise a shaft channel 114. In further detail, the shaft channel 114 is an elongated slot on top of the first housing 11 to allow access to the screw jack assembly 2 and the input shaft 50. The shaft channel 114 can be reinforced to add strength to the arm. The shaft channel 114 traverses into the first housing 11, and the input shaft 50 is slidably engaged into the shaft channel 114. Thus, input shaft 50 does not disrupt the telescopic connection between the first housing 11 and the second housing 10.

Although the invention has been explained in relation to its preferred embodiment, it is to be understood that many other possible modifications and variations can be made without departing from the spirit and scope of the invention. Although specific advantages have been enumerated above, various embodiments may include some, none, or all of the enumerated advantages.

What is claimed is:
1. A remotely adjustable automotive lift arm comprises:
a telescopic arm;
a screw jack assembly;
a camera assembly;
a gear assembly;
an input shaft;
the telescopic arm comprises a first housing, a second housing, and a pair of attachment features;
the screw jack assembly comprises a screw, a lifting pad, and an aperture;
the second housing being sleeved by the first housing;
the pair of attachment features being terminally integrated into the first housing, opposite the second housing;
the lifting pad being terminally connected to the screw;
the aperture traversing through the lifting pad;
the screw being threadably mounted into the second housing;
the lifting pad being positioned external to the second housing;
the input shaft being mounted to the second housing, offset from the screw;
the screw and the input shaft being parallel to each other;
the screw being torsionally engaged to the input shaft by the gear assembly;
the camera assembly being compressibly mounted within the screw; and
a camera module of the camera assembly being in optical communication with the aperture.
2. The remotely adjustable automotive lift arm as claimed in claim 1 comprises:
a spring;
the camera assembly further comprises a camera mount and a flange;
the flange being terminally connected to the camera mount;
the camera mount and the camera module being positioned within a longitudinal channel of the screw;
the flange being positioned external to the second housing, opposite to the lifting pad;
the camera module being sleeved by the camera mount;

the spring being positioned within a spring-receiving channel of the camera mount; and the camera module being pressed against the lifting pad by the spring.

3. The remotely adjustable automotive lift arm as claimed in claim 1 comprises:

the gear assembly comprises an input sprocket gear, an output sprocket gear, an output threaded sleeve, and a roller chain;

the input shaft being rotatably mounted within the second housing;

the input sprocket gear being laterally connected to the input shaft;

the output threaded sleeve being rotatably mounted within the second housing;

the output sprocket gear being laterally connected to the output threaded sleeve;

the output threaded sleeve being engaged by the screw; and the input sprocket gear being torsionally engaged to the output sprocket gear by the roller chain.

4. The remotely adjustable automotive lift arm as claimed in claim 1 comprises:

the gear assembly comprises an input sprocket gear, an output sprocket gear, an input threaded sleeve, an output threaded sleeve, and a roller chain;

the input threaded sleeve and the output threaded sleeve being externally mounted onto the second housing;

the input threaded sleeve and the output threaded sleeve being positioned offset from each other;

the input threaded sleeve being threadably engaged by the input shaft;

the output threaded sleeve being engaged by the screw;

the input sprocket gear and the output sprocket gear being positioned within the second housing;

the input sprocket gear being laterally connected to the input shaft;

the output sprocket gear being laterally connected to the screw; and the input sprocket gear being torsionally engaged to the output sprocket gear by the roller chain.

5. The remotely adjustable automotive lift arm as claimed in claim 1 comprises:

an extension handle;

the extension handle being positioned external to the telescopic arm; and the extension handle being torsionally engaged to the input shaft.

6. The remotely adjustable automotive lift arm as claimed in claim 1 comprises:

a cable assembly comprises a cable body, a cable sleeve, a first cable guide, a second cable guide, a cable lever, and a lifting carriage anchor;

the cable body comprises a fixed body end and a free body end;

the cable lever comprises a fixed lever end and a free lever end;

the cable lever being positioned external to the second housing, opposite to the lifting pad;

the fixed lever end being torsionally connected to the camera assembly;

the fixed body end being connected to the free lever end;

the first cable guide being connected external to the first housing;

the second cable guide being connected external to the second housing;

the cable sleeve being connected in between the first cable guide and the second cable guide;

the cable body traversing through the cable sleeve; and the free body end being connected to the lifting carriage anchor.

7. The remotely adjustable automotive lift arm as claimed in claim 1 comprises:

the camera assembly further comprises at least one light; and the at least one light being integrated into the camera module.

8. The remotely adjustable automotive lift arm as claimed in claim 1 comprises:

the telescopic arm further comprises a shaft channel;

the shaft channel traversing into the first housing; and the input shaft being slidably engaged into the shaft channel.

* * * * *